United States Patent
Conley, Jr.

(10) Patent No.: US 6,217,074 B1
(45) Date of Patent: Apr. 17, 2001

(54) METHOD AND SYSTEM FOR GENERATING, STORING AND MANAGING RECORDS

(75) Inventor: Ralph F. Conley, Jr., Miamisburg, OH (US)

(73) Assignee: Direct Business Technologies, Inc., Dayton, OH (US)

(*) Notice: Subject to any disclaimer, the term of this patent is extended or adjusted under 35 U.S.C. 154(b) by 0 days.

(21) Appl. No.: 09/313,733

(22) Filed: May 18, 1999

Related U.S. Application Data

(62) Division of application No. 08/586,190, filed on Jan. 16, 1996.

(51) Int. Cl.[7] .............................. B42F 21/06; B42F 13/00; A45C 11/18; A45C 11/34
(52) U.S. Cl. .............................. 281/15.1; 283/44; 283/55; 283/66.1; 283/67; 283/70; 283/115
(58) Field of Search ............................ 283/44, 55, 66.1, 283/67, 70, 115; 281/15.1

(56) References Cited

U.S. PATENT DOCUMENTS

| | | |
|---|---|---|
| 703,023 | 6/1902 | Wade . |
| 986,000 | 3/1911 | Hart . |
| 1,435,664 * | 11/1922 | Russell ................................. 283/67 |
| 1,529,264 | 3/1925 | Mayers . |
| 1,585,237 | 5/1926 | Doughty . |
| 2,631,589 | 3/1953 | Zalkind . |
| 3,257,127 | 6/1966 | Tilton, Jr. . |
| 3,312,384 | 4/1967 | Heynemann . |
| 3,839,809 | 10/1974 | Casaas et al. . |
| 3,885,726 | 5/1975 | Fridlund et al. . |
| 4,463,848 * | 8/1984 | Parker ................................. 283/67 |
| 4,519,629 | 5/1985 | Podosek . |
| 4,549,688 | 10/1985 | Ozmon et al. . |
| 4,576,328 | 3/1986 | Snider et al. . |
| 4,602,734 | 7/1986 | Thompson . |

(List continued on next page.)

FOREIGN PATENT DOCUMENTS 9787    5/1895  (GB) .

*Primary Examiner*—A. L. Wellington
*Assistant Examiner*—Mark T. Henderson
(74) *Attorney, Agent, or Firm*—Jacox, Meckstroth Jenkins

(57) ABSTRACT

A method and system for generating, inventorying, storing and managing records and record forms is disclosed. The record management system and method utilizes a system record generator which generates a plurality of policies, record forms and the like in response to a questionnaire record. Customized record forms and policies are generated and stored in a unique record receiver having indicia for clearly identifying forms therein. A record holder is also provided for storing, inventorying, and managing the record forms used. The method and system are particularly useful for managing and insuring that record forms are completed for employees in a company by providing convenient means for visually identifying record forms, such as employment applications and the like, for ascertaining when one or more forms is missing by the presence of an empty compartment in the record holder.

11 Claims, 9 Drawing Sheets

U.S. PATENT DOCUMENTS

| | | |
|---|---|---|
| 4,629,349 | 12/1986 | Pitts . |
| 4,743,747 | 5/1988 | Fougere et al. . |
| 4,784,508 * | 11/1988 | Shannon ................................. 402/79 |
| 4,893,745 | 1/1990 | Weber et al. . |
| 4,970,984 | 11/1990 | Vazquez . |
| 4,973,086 | 11/1990 | Donnelly et al. . |
| 4,978,143 | 12/1990 | Ericson . |
| 5,020,411 | 6/1991 | Rowan . |
| 5,025,979 | 6/1991 | Dellacroce . |
| 5,042,841 | 8/1991 | Freidman . |
| 5,085,469 | 2/1992 | Castro . |
| 5,123,676 * | 6/1992 | Donnelly et al. ....................... 283/37 |
| 5,213,461 * | 5/1993 | Kalisher .................................. 283/67 |
| 5,241,600 | 8/1993 | Hillis . |
| 5,242,197 | 9/1993 | Raynak . |
| 5,295,622 | 3/1994 | Lorber . |
| 5,321,749 | 6/1994 | Virga . |
| 5,337,358 | 8/1994 | Axelrod . |
| 5,337,361 | 8/1994 | Wang et al. . |
| 5,340,158 | 8/1994 | Bartl . |
| 5,384,846 | 1/1995 | Berson . |
| 5,411,293 | 5/1995 | Monzyk . |
| 5,420,924 | 5/1995 | Berson . |
| 5,593,086 | 1/1997 | Ho . |
| 5,613,791 | 3/1997 | Medenica . |
| 5,876,145 * | 3/1999 | Datum .................................... 281/42 |

* cited by examiner

FIG. 5

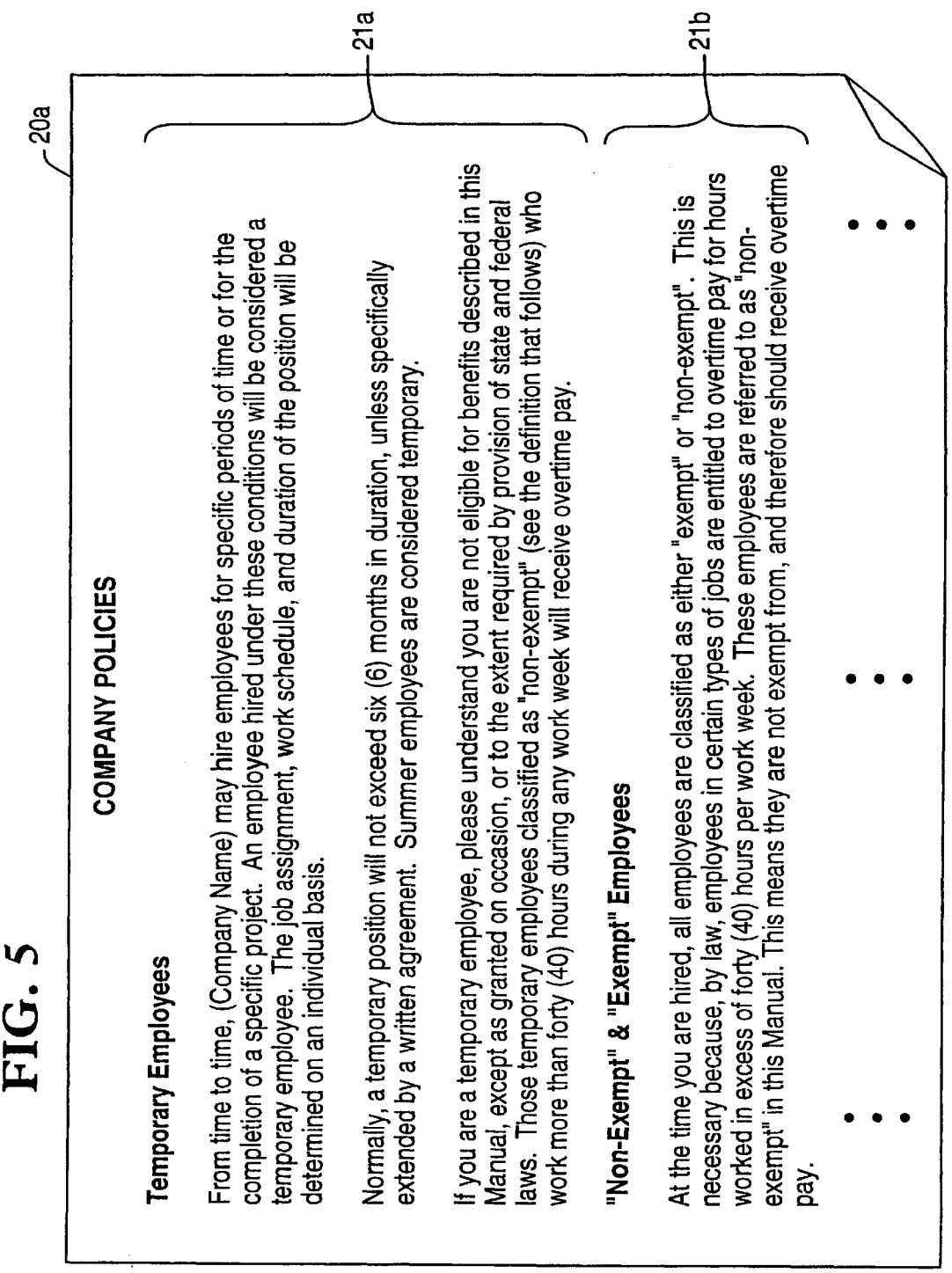

COMPANY POLICIES

Temporary Employees

From time to time, (Company Name) may hire employees for specific periods of time or for the completion of a specific project. An employee hired under these conditions will be considered a temporary employee. The job assignment, work schedule, and duration of the position will be determined on an individual basis.

Normally, a temporary position will not exceed six (6) months in duration, unless specifically extended by a written agreement. Summer employees are considered temporary.

If you are a temporary employee, please understand you are not eligible for benefits described in this Manual, except as granted on occasion, or to the extent required by provision of state and federal laws. Those temporary employees classified as "non-exempt" (see the definition that follows) who work more than forty (40) hours during any work week will receive overtime pay.

"Non-Exempt" & "Exempt" Employees

At the time you are hired, all employees are classified as either "exempt" or "non-exempt". This is necessary because, by law, employees in certain types of jobs are entitled to overtime pay for hours worked in excess of forty (40) hours per work week. These employees are referred to as "non-exempt" in this Manual. This means they are not exempt from, and therefore should receive overtime pay.

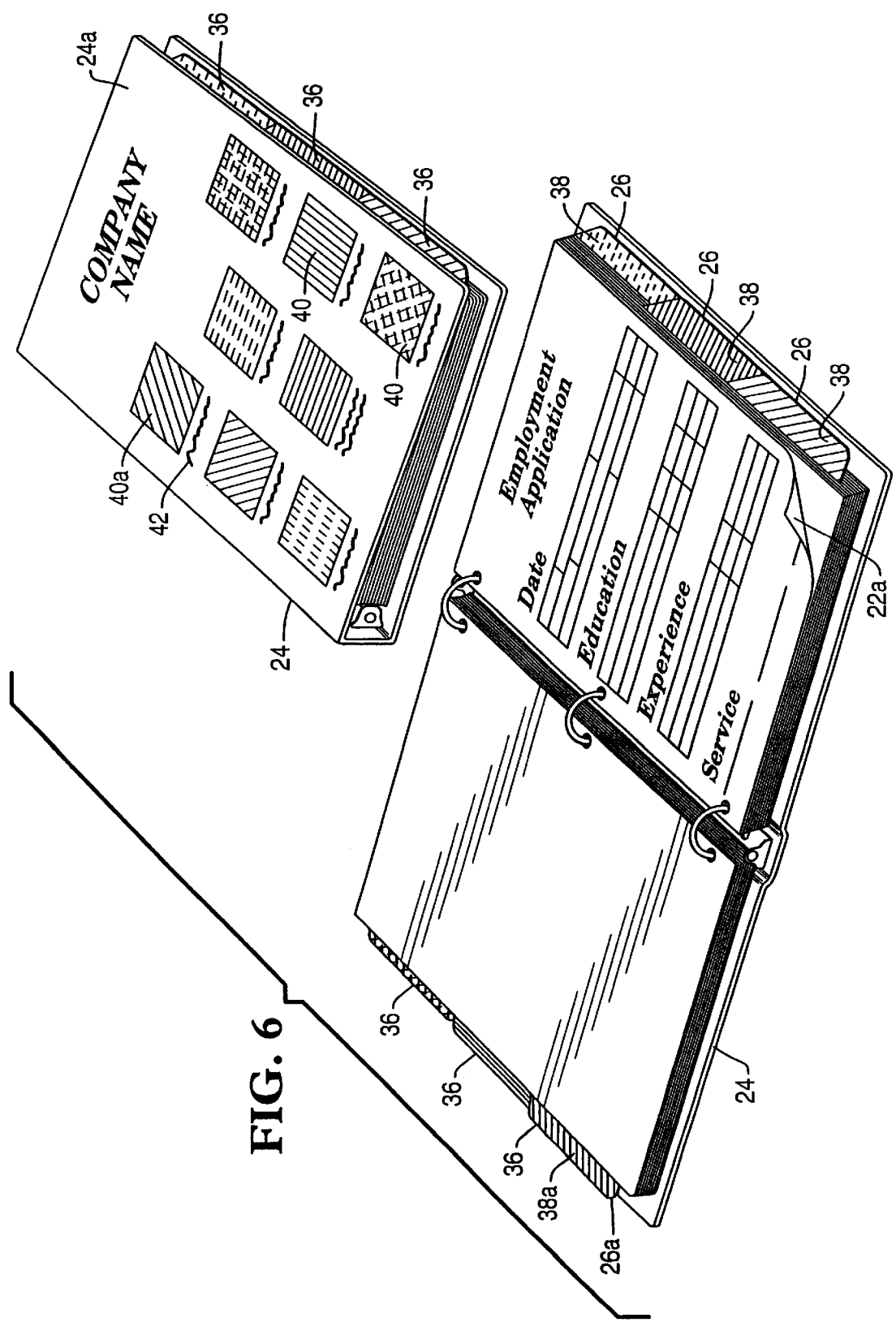

METHOD AND SYSTEM FOR GENERATING, STORING AND MANAGING RECORDS

CROSS-REFERENCE TO RELATED APPLICATIONS

This application is a division of Ser. No. 08/586,190 filed Jan. 16, 1996.

BACKGROUND OF THE INVENTION

1. Field of the Invention

This invention relates to a record management system and method and, more particularly, to a system and method for generating customized policies, forms and for providing a record management system for receiving and storing both unused and used record forms.

2. Description of Related Art

In the past, many companies have spent considerable amounts of time, effort and money generating policies and appropriate forms for use in their business. It was not uncommon, for example, to have a single employee fill out numerous forms prior to, during and after employment with the company. Typically, the forms were not organized into a single record receiver. Also, after the forms were used, there was no convenient means for identifying the forms or for storing them for a single employee. For example, for a single employee of the company there would simply be a single folder with any forms associated with that employee simply being situated therein. Typically, there was no way of identifying which forms were in the folder. Also, the forms were not organized into any coherent or convenient order. Unfortunately, this sometimes resulted in forms which were required to be completed to be overlooked.

What is needed therefore, is a record management system and method which will conveniently generate the necessary forms, provide storage for the necessary forms prior to use and subsequently store the necessary forms into a convenient storage receiver.

SUMMARY OF THE INVENTION

It is, therefore, a primary object of this invention to provide a system and method for generating a plurality of policies, record forms and for providing a record management system and method for identifying and storing record forms before and after they are used.

It is also an object of this invention to provide a record management system which comprises storage means for storing record forms and also providing means for concealing some information, such as confidential information, while revealing other information, such as non-confidential information.

It is another object of this invention to provide a system and method for generating customized policies, forms, storage and retrieval devices for such customized forms.

In one aspect, this invention comprises a record holder consisting of a container comprising a plurality of compartments, a first indicia associated with one of the plurality of compartments, a second indicia associated with another of the plurality of compartments, a cover secured to the container for closing said plurality of compartments such that the first indicia is visible while the second indicia is concealed.

In another aspect, this invention comprises a file management system consisting of storage means for storing an inventory of a plurality of forms into a predetermined order, where the storage means comprises a plurality of separators for separating the plurality of forms, a first plurality of indicia associated with the plurality of separators, respectively form holder means for holding some of the plurality of forms, the form holder means comprising a second plurality of separators for separating the some of the plurality of forms, and a second plurality of indicia associated with the second plurality of separators, wherein the second plurality of indicia correspond to the first plurality of indicia.

In still another aspect this invention, this invention comprises a method for filing a plurality of forms in a form management system, storing an inventory of the plurality of forms in a first storage container, the first storage container comprising a plurality of compartments separated by a plurality of compartment separators, respectively, each of the plurality of compartment separators comprising at least one first indicia, using at least one of the plurality of forms; and storing the at least one of the plurality of forms used during the using step in a second storage container comprising a second plurality of compartments separated by a second plurality of compartment separators, each of the second plurality of compartment separators comprising at least one second indicia which generally corresponds to the first indicia.

In yet another aspect of this invention, this invention comprises a form management system and method consisting of a plurality of kits each comprising a plurality of forms, at least one of the plurality of kits comprising a form identifier associated therewith, a storage device for organizing the plurality of forms into separate storage device compartments, at least one of the storage device compartments comprising a second form identifier associated therewith, a record holder for organizing the plurality of forms into separate form holder compartments, at least one of the record holder compartments comprising a third form identifier associated therewith, the form identifier, the second form identifier and the third form identifier comprising at least one common characteristic.

In yet another aspect of this invention, this invention comprises a method for managing records comprising the steps of generating a plurality of management forms, situating the plurality of management forms into a record receiver having an identifier for identifying at least one of the plurality of management forms, using the at least one of the plurality of management forms, organizing those of the plurality of management forms utilized in the using step into a predetermined order in a record holder.

These and other objects and advantages of the invention will be apparent from the following description, the accompanying drawings and the appended claims.

BRIEF DESCRIPTION OF THE ACCOMPANYING DRAWINGS

FIG. 5 is a portion of a policy situated in the policy manual shown in FIG. 3 showing a policy generated in response to a question on the manual questionnaire record of FIG. 2;

FIG. 6 is a view of a record receiver in a closed and an open position;

DETAILED DESCRIPTION OF THE INVENTION

Figure 1:
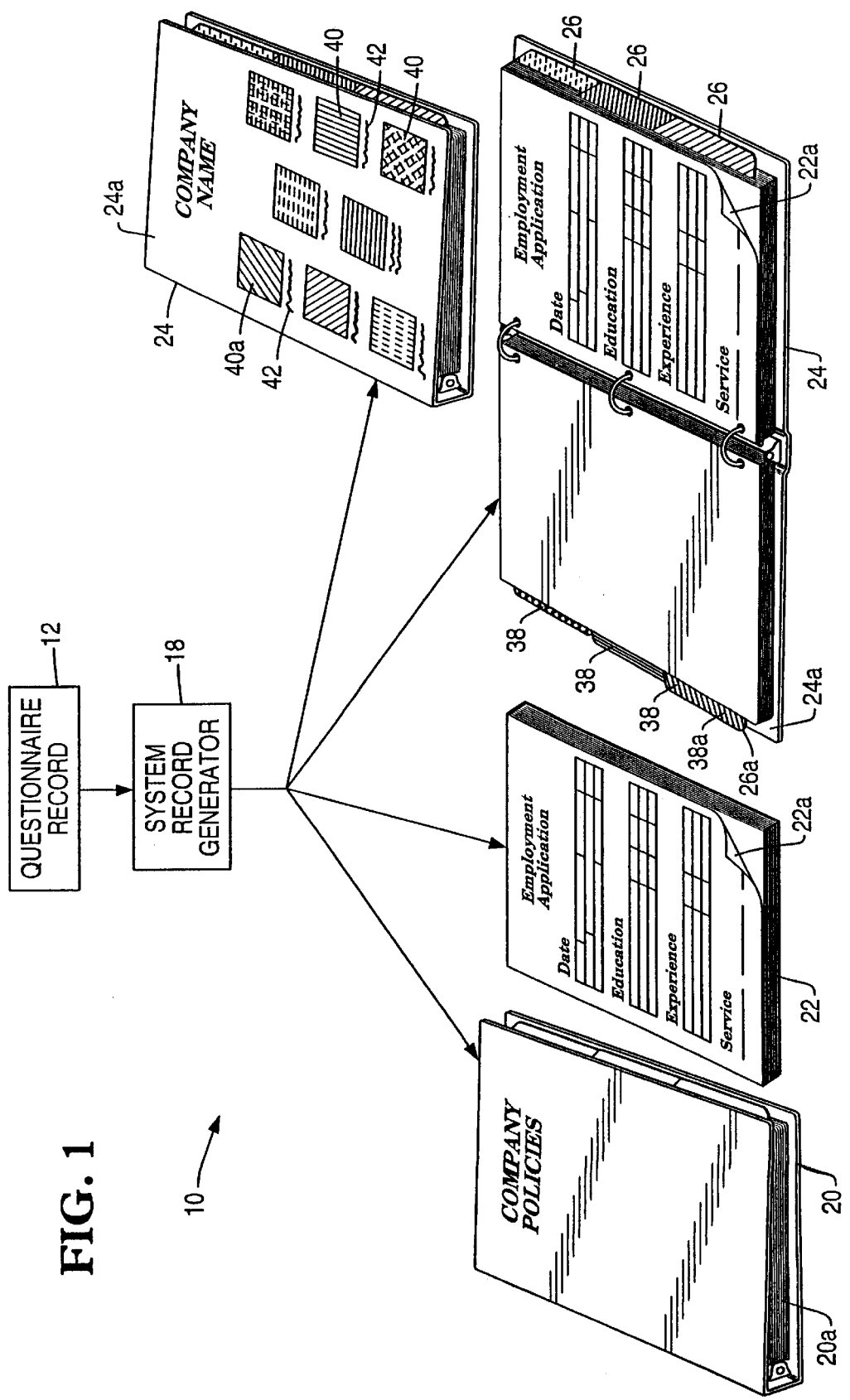
FIG. 1 is a view showing a system for generating company policies, record forms and a record receiver.
Figure 2:
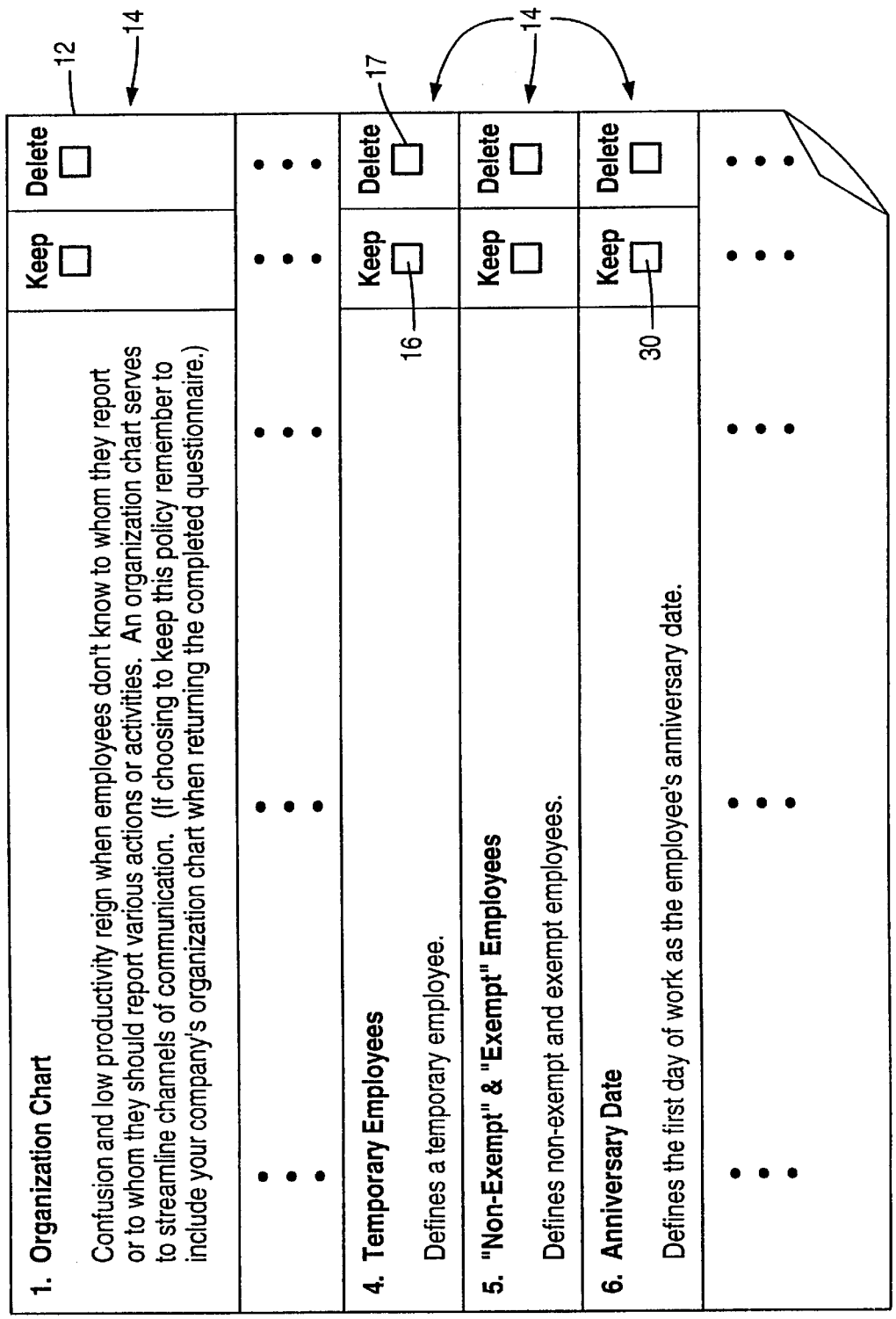
FIG. 2 is a view of a questionnaire record for use in the present invention.

Referring now to FIG. 1, a system 10 for generating and managing a plurality of policies and records is shown. The system comprises a questionnaire record 12. As best illustrated in FIG. 2, the questionnaire record 12 comprises a plurality of record information areas 14 which provide a plurality of questions to elicit various customized information. In the embodiment being described, the customized information relates to company policies (such as personnel, property, health, safety and the like) and employment information, but it should be appreciated that the customized information could relate to other areas as well. For example, question No. 4 on questionnaire record 12 asks the user of the questionnaire record 12 a question regarding whether it desires to have a policy regarding temporary employees, in which case the user would check the "keep" box 16. Identifying a "keep" box 16 provides means for identifying those policies and/or provisions which the user wishes to include as part of its corporate policies. If a policy is not desired, then the user would mark the "delete" box 17.

After all the questions on the questionnaire record 12 have been completed, a system record generator 18 (FIG. 1) generates a customized policy set 20, at least one customized record form set 22 comprised of a plurality of record forms 22a and a customized record receiver 24 for receiving a plurality of customized record forms 22a.

The customized policy set 20 comprises a plurality of policy sheets 20a (FIG. 5) comprising a plurality of policies, such as policies 21a and 21b, which are generated in response to the information on the questionnaire record 12. For example, after the user indicates that it was desirous of keeping a policy for defining a temporary employee by checking the keep box 16 (FIG. 2) on questionnaire record 12, then a corresponding customized policy 21a (FIG. 5) is generated by the system record generator 18.

Figure 11:
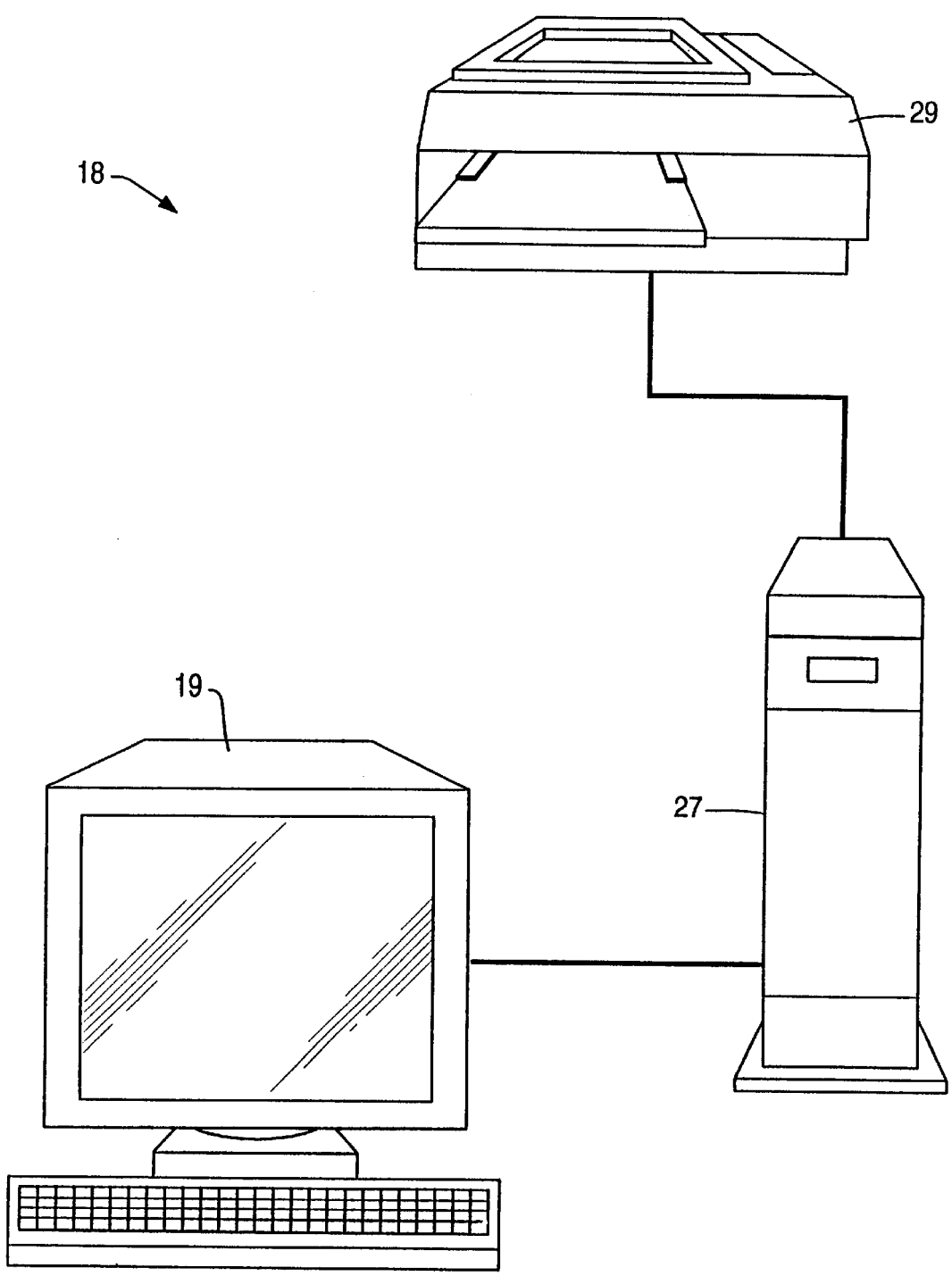
FIG. 11 shows a system record generator in accordance with one embodiment of the invention.

FIG. 11 illustrates components comprising the system record generator 18 in accordance with one embodiment of the invention. The system record generator 18 comprises a work station 19 which is coupled to a server 27 which, in turn, is coupled to a laser printer 29. In the embodiment being described the work station 19 may comprise an IBM compatible PC having a Windows NT™ or Windows 95™ operating system which are available from Microsoft Corporation. Suitable software, such as Microsoft Word™, which is also available from Microsoft Corporation, may be used to generate the various record forms 22a and policies 21a and 21b and the like.

The server 21 may comprise an IBM compatible PC which is also running a Windows NT server operating system available from Microsoft Corporation. The printer 23 may comprise a laser printer available from Hewlett Packard or any suitable device for printing the form set 22, record receiver 24 and various record forms 22a and policies 21a and 21b.

In the embodiment being described, a software template created in the Microsoft Word™ program may be stored in the server 27 and accessed by the work station 19. When a questionnaire record 12 is received, the template is accessed and opened using work station 19. Using various macros provided in Microsoft Word™, a color coding feature and basic Microsoft Word™ editing features, the template is adjusted to reflect the responses given in the completed questionnaire record 12. The template is then re-named and stored as a new and unique document on server 27. The document is thereafter printed in response to a print command sent from work station 19 to server 27 which then causes the laser printer 29 to print the document. Also, although not shown, the system record generator 18 may comprise a tape back-up for backing up information stored on the server 27.

Thus, it should be appreciated that system 10 provides means for generating the customized policy 20 comprising a plurality of policies 21a and 21b in response to the questionnaire record 12.

Figure 3:
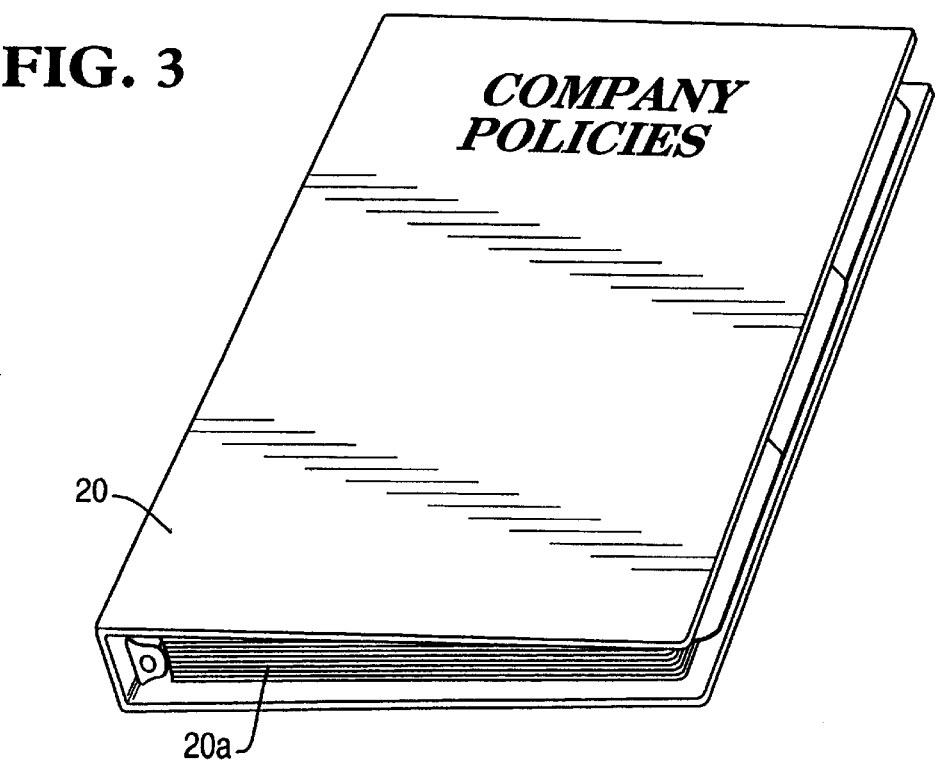
FIG. 3 is a view of a policy manual generated by a system record generator in response to the manual questionnaire record shown in FIG. 2.
Figure 4:
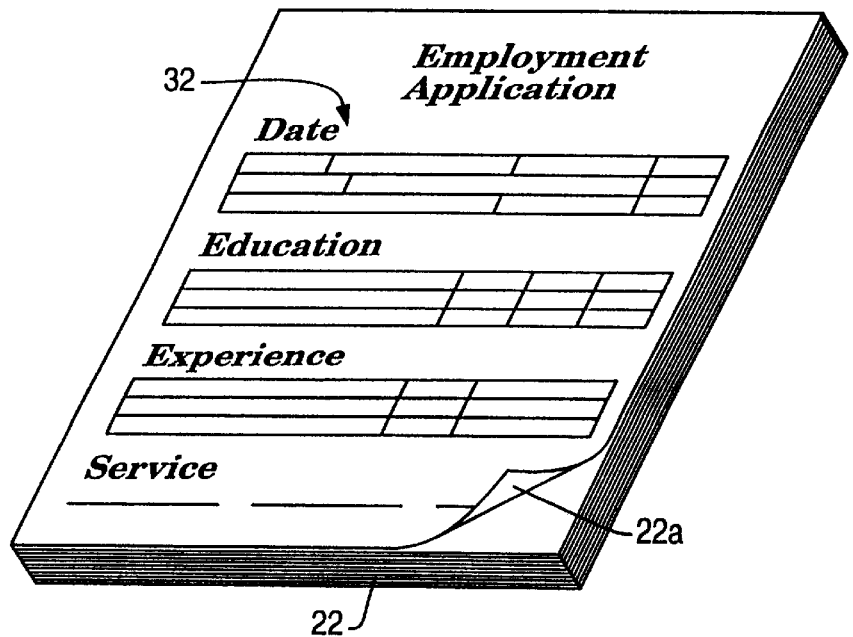
FIG. 4 is a kit or compilation of record forms generated by the system generator shown in FIG. 1.

After all questions on the record 12 have been completed and the customized policy set 20 (FIG. 3) is generated, then system record generator 18 may generate the plurality of record forms 22a comprising the customized record form set 22 (FIG. 4) in response to the questionnaire record 12. For example, if the user checks the "keep" box 30 (FIG. 2) corresponding to a question 6 regarding an employee's anniversary date, then not only would a corresponding policy be generated for the customized policy set 20, but a customized record form 22a, like on employment application form (labeled 22a in FIG. 4), therefor, may be generated to have a corresponding area (such as area 32 in FIG. 4), for identifying the employee's anniversary date. Thus, it should be appreciated that the system record generator 18 utilizes the questionnaire record 12 to generate a customized record form set 22.

In the embodiment being described, each customized record form set 22 may be provided to provide a plurality of one type of form, such as an employment application; an absent, vacation, leave and warnings form; accident and injury form; termination form; COBRA form; insurance forms; safety forms; employment agreements; government forms and the like.

Once the customized policy set 20 and customized record from set 22 are generated, then various record forms 22a from a plurality of sets 22 (FIG. 4) may be assembled or compiled into a storage means, storage organizer or record receiver 24 (FIG. 6). In the embodiment being described, the record receiver 24 may comprise a binder or other suitable storage device. In this embodiment, the record receiver 24 comprises a cover 24a comprising a plurality of separators 26 for separating the various record forms 22a into a plurality of different compartments defined by the area between adjacent separators.

Notice that a plurality of indicia 40 (FIG. 1) are situated on cover 24a and correspond to indicia 38 used on the plurality of separators 36. For example, cover 24a may comprise indicia 38a (FIG. 6) which corresponds to indicia 40a on separator 26a.

The cover 24a may also comprise information 42 associated with each indicia 38a to facilitate correlating indicia 38a corresponding to a particular customized record form 22a, such as the employment application 22a.

Advantageously, the system and method of the present invention provides means for quickly organizing, inventorying, and identifying various customized record forms 22a, such as the employment application shown in FIG. 6, for easy use and referral. The record form receiver 24 may comprise any type desired customized record form 22a, and it should be appreciated that the indicia 38 and 40 could be any suitable means for identifying the separated forms. For example, the indicia 38 and 40 could comprise a plurality of colors, shades, art work or the like as may facilitate making the various separators 36 and corresponding customized record forms 22a easy to identify.

Figure 7:
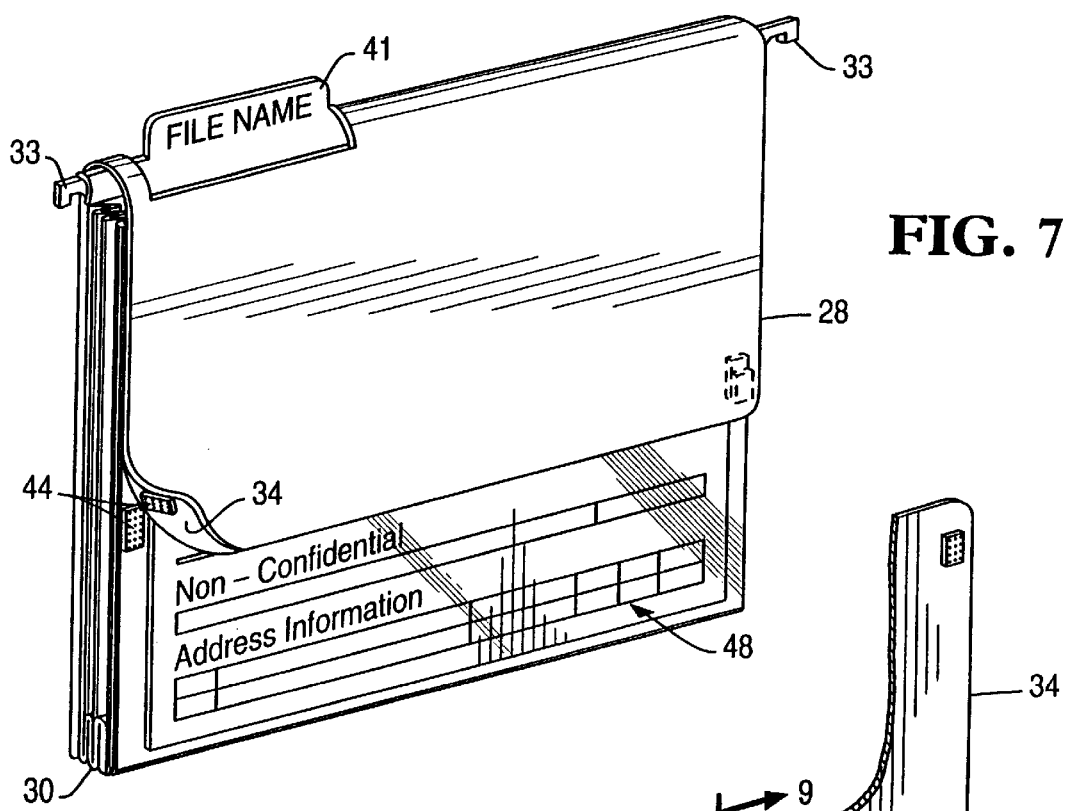
FIG. 7 is a view of a record holder shown with a cover in a closed position.
Figure 8:
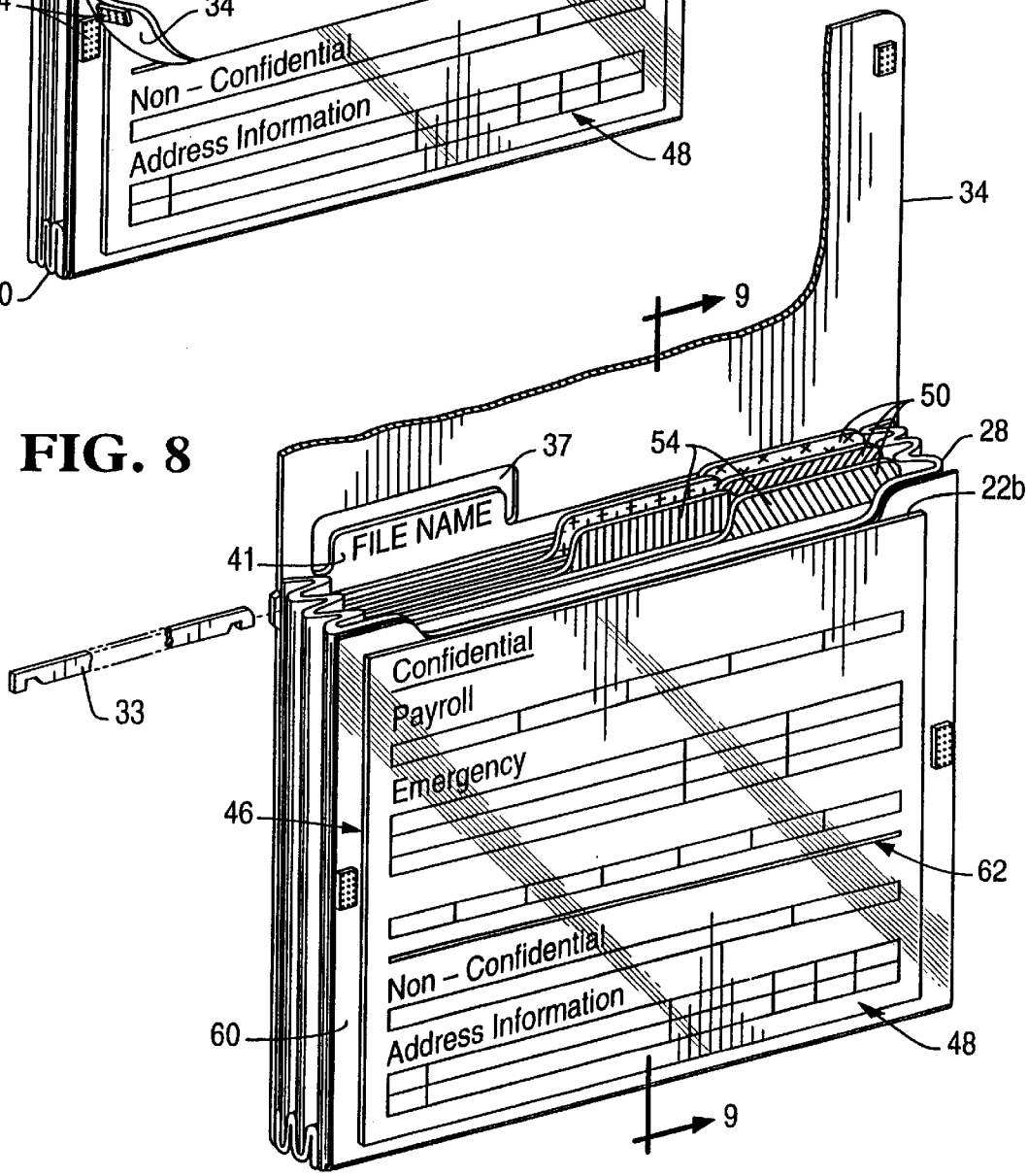
FIG. 8 is another view of the record holder shown in FIG. 7 showing the cover in an open position.
Figure 9:
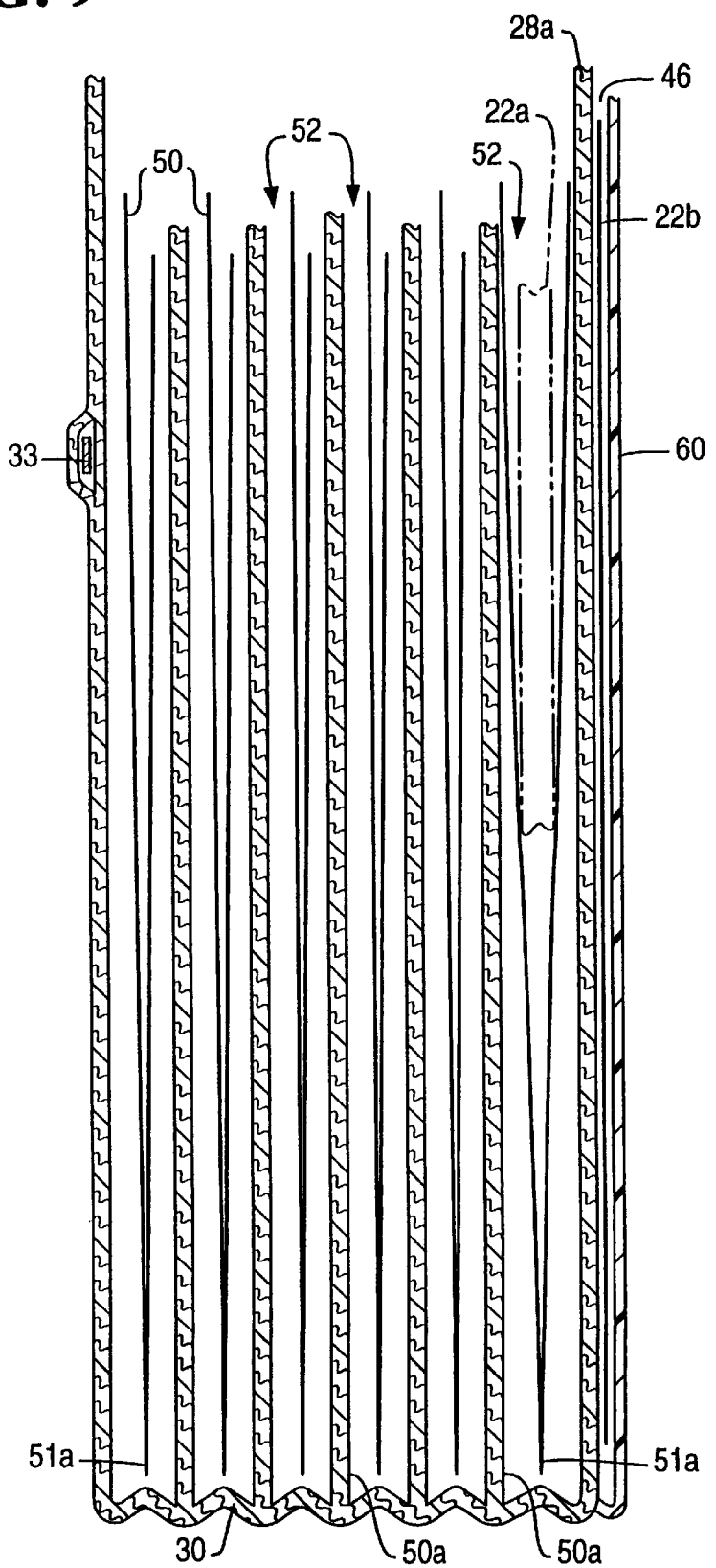
FIG. 9 is a cross-sectional view of the record holder shown in FIGS. 7 and 8.

Referring now to FIGS. 7–9, a record holder 28 is shown comprising a container 30 having a plurality of record form receiving areas 52 (FIG. 9). As best illustrated in FIG. 8, the container 30 also comprises a support 33 for supporting the record holder 28, for example, in a drawer (not shown) or file cabinet (not shown). The container 30 further comprises a cover 34 secured or integrally formed as part of the container 30. Notice that cover 34 further comprises an aperture 37 which facilitates revealing an indicia or identifier 41 when the cover 34 is in a closed position, as illustrated in FIG. 7.

Notice in FIG. 9 that the record holder 28 further comprises a plurality of separators 50 having indicia 54 thereon. In the embodiment being described, the indicia 54 correspond to the indicia 38 and 40 described above relative to the record receiver 24 (FIG. 6).

In the embodiment being described, the separators 50 may comprise separate wall dividers (such as walls 50a in FIG. 9) having the indicia 54 situated thereon. Alternatively, separators 50 may include separate removable folders 51a (as viewed in FIG. 9) or other means for separating the customized record forms 22a so that they are suitable for receiving and storing at least one of the record forms 22a. Notice that the indicia 54 (FIG. 8) correspond directly to the indicia 38 and 40 shown in FIG. 6 which provides means for easily identifying the record forms 22a prior to their use and also after they are used and stored in record holder 28. This facilitates providing a convenient form inventory and management system for keeping track of, accounting for, and managing the numerous record forms 22a that are used in a business. The indicia 54 may comprise color, marking, lettering, graphics and the like, as with the indicia 38 and 40. In the embodiment being described, the folders 51a themselves may be colored to provide or define the indicia 54.

The record holder 28 further comprises locking means or a lock 44 (FIG. 7) which, in the embodiment being described, may be VELCRO™, a string tie arrangement (not shown) or any suitable means for securing cover 34 in the closed position shown in FIG. 7.

The system and method of the present invention also comprises security means for concealing certain information, such as confidential information 46 (FIG. 8) while revealing non-confidential information, such as information 48. As best illustrated in FIGS. 8 and 9, the record holder 28 comprises a transparent sheet or cover 60 (FIG. 9) which cooperates with a wall 28a of record holder 28 to define a compartment 46 (FIG. 9) for receiving and storing a customized record form 22b. As best illustrated in FIG. 8, record form 22b comprises a confidential area 46, defined by the area above line 62, and a non-confidential area 48 defined by the area below line 62 (as viewed in FIG. 8). As illustrated in FIG. 7, when cover 34 is in the closed position shown in FIG. 7, the confidential information area 46 is covered, thereby concealing any information in the confidential area 46 of the record form 22b. Simultaneously, any information in the non-confidential area 48 is revealed.

It has been found that the record holder 28 is particularly suitable for use in an employment environment where it is important to maintain the confidentiality of some information, such as employment review information, payroll and wage information and the like, while revealing other non-confidential information, such as an employee's name and address. One method for utilizing the features of the present invention will now be described with respect to FIG. 10.

The method starts by completing the questionnaire record 12 (FIG. 1) at block 90. At decision block 92 (FIG. 10), it is determined whether or not the questionnaire record 12 is complete. If it is not, then the method loops back to block 90 as shown. If it is, then the method proceeds to block 94 where the customized policy 20 (FIG. 1) is generated by the system record generator 18 in a manner described earlier herein.

Figure 10:
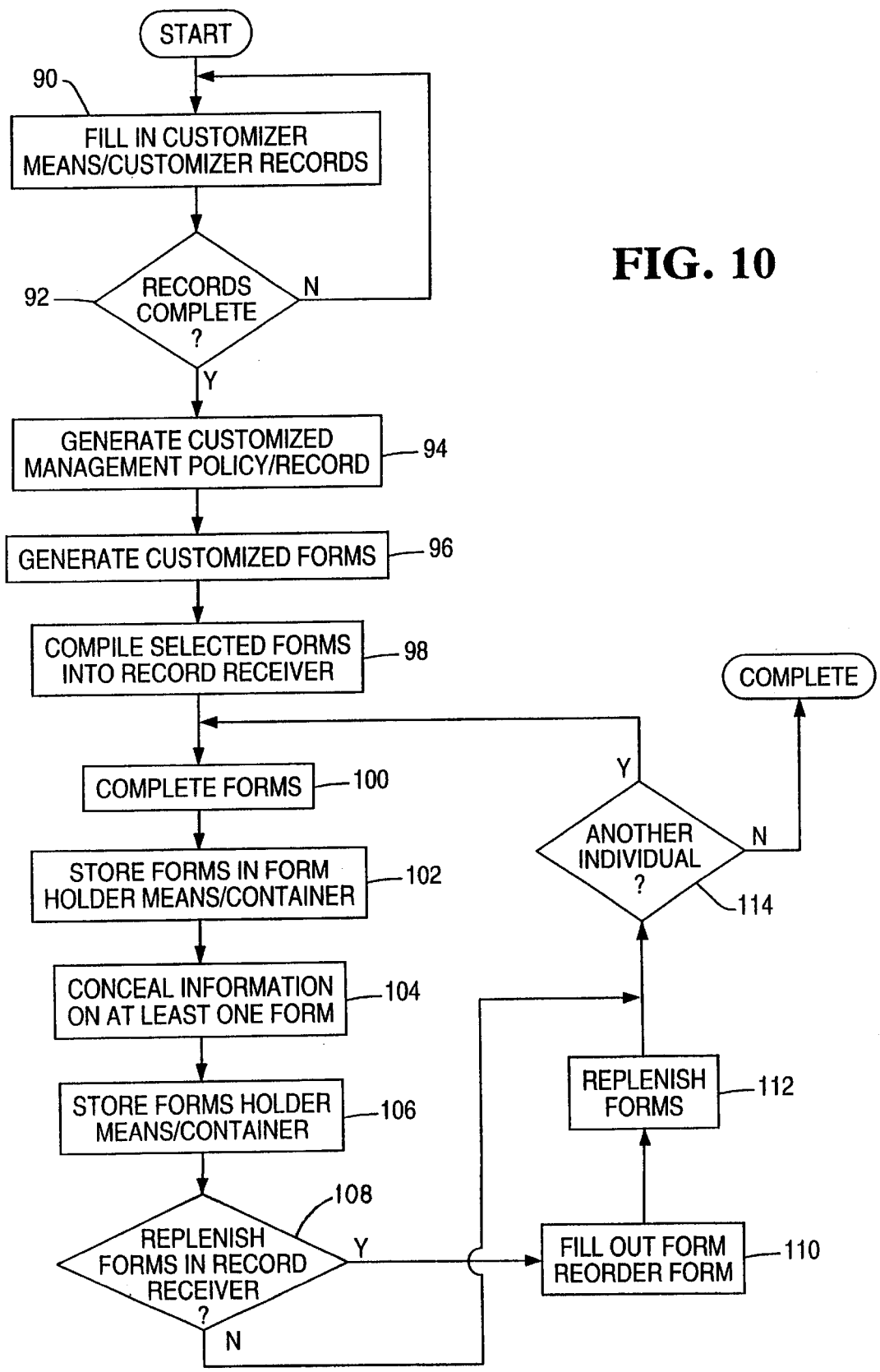
FIG. 10 is a schematic view of a method and process of the present invention.

The system record generator 18 generates the customized record set 22 at block 96 (FIG. 10). Selected customized record forms 22a from one or more sets are then compiled into the record receiver 24 (block 98 in FIG. 10).

Throughout the normal course of business, the record forms 22a may be removed from the record receiver 24 and completed (block 100) and, thereafter, stored in the record holder 29 (block 102).

When the cover 34 on container 30 is secured in the closed position, the confidential information area 46 on record form 22b may then be concealed (block 104).

At block 106, the record holder 28 may then be stored in any suitable storage, such as a file cabinet. At decision block 108, it is determined whether any of the record forms 22 utilized in the record receiver 24 need to be replenished. If they do, then a reorder form (not shown) may be situated in the record receiver 24 such that a user may easily reorder any missing forms 22 from a form supplier (not shown). In this regard, the user would fill out the reorder form (block 110 in FIG. 10) and send it to the supplier. At block 112, a replenishment supply of forms 22a is supplied for storing in and replenishing of the record receiver 24.

It should be appreciated that the record receiver 24 may provide or store a plurality of identical record forms 22 for use by multiple individuals. The record holder 28 shown in FIGS. 7–9 is suitable for retaining all record forms 22 associated, for example, with a single individual or entity. At decision block 114, it is determined whether record forms 22 for another individual need to be completed. If they do, then the method loops back to block 100 as shown. If they do not, then the process is complete. Notice that if the decision at decision 108 is negative, then the process loops to decision block 114 as shown.

Advantageously, this method and system provide means for generating customized policies and forms for use, for example, in a business. The system and method also provide means for collecting, inventorying and compiling the forms and subsequently storing the forms after their use. Further, the system and method provides means for easily identifying and separating the forms into convenient compartments and for ultimately storing the forms into coded areas after they are used so they can be easily identified by the user.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A method for managing records comprising the steps of:
   generating a plurality of management forms;
   situating said plurality of management forms into a record receiver having an identifier for identifying at least one of said plurality of management forms;
   using said at least one of said plurality of management forms;
   organizing those of said plurality of management forms utilized in said using step into a predetermined order in a record holder;
   said method further comprises the step of:
      providing a record holder having a plurality of compartments;
      situating at least one folder in each of said plurality of compartments.

2. The method as recited in claim 1 wherein said method further comprises the step of:
   correlating said plurality of management forms in said record receiver with the forms identified in said record holder.

3. The method as recited in claim 2 wherein said plurality of management forms comprises at least one application form.

4. The method as recited in claim 1 wherein said method further comprises the step of:
   completing a customizer record having a plurality of selection criteria;
   generating a customizer management policy in response to said selected customizer record.

5. The method as recited in claim 4 wherein said method further comprises the step of:
   identifying a desired form using said customizer record; and
   compiling a plurality of said desired forms.

6. The method as recited in claim 1 wherein said plurality of management forms comprises at least one employment form.

7. The method as recited in claim 1 wherein said plurality of management forms comprises at least one application form.

8. The method as recited in claim 1 wherein said method further comprises the steps of:
   associating an indicia with each of said plurality of management forms;
   using said indicia in said record receiver and said record holder to identify said plurality of management forms.

9. The method as recited in claim 8 wherein said method further comprises the step of:
   using at least one color as said indicia; said color identifying at least one of said plurality of management forms.

10. A method for managing records comprising the steps of:
    generating a plurality of management forms;
    situating said plurality of management forms into a record receiver having an identifier for identifying at least one of said plurality of management forms;
    using said at least one of said plurality of management forms;
    organizing those of said plurality of management forms utilized in said using step into a predetermined order in a record holder;
    said method further comprises the step of:
       recording information on a first management form;
       situating said first management form in a compartment associated with said record holder;
       closing a lid situated on said record holder such that at least a portion of said information on said first management form becomes concealed.

11. A method for managing records comprising the steps of:
    generating a plurality of management forms;
    situating said plurality of management forms into a record receiver having an identifier for identifying at least one of said plurality of management forms;
    using said at least one of said plurality of management forms;
    organizing those of said plurality of management forms utilized in said using step into a predetermined order in a record holder;
    said method further comprising the step of:
       providing at least one folder having a predetermined color corresponding to one of said plurality of management forms;
       situating said at least one folder in at least one of a plurality of compartments in said record holder;
       using said predetermined color to identify said preselected management form in said record receiver.

* * * * *